Patented Sept. 16, 1924.

1,508,899

UNITED STATES PATENT OFFICE.

WILLIAM STOCKS, OF FITZROY, VICTORIA, AUSTRALIA.

COMPOSITION OF MATTER FOR USE IN LIEU OF LEATHER OR FOR OTHER SUITABLE PURPOSES AND METHOD OR PROCESS OF MANUFACTURING SAME.

No Drawing.   Application filed November 8, 1918.   Serial No. 261,734.

*To all whom it may concern:*

Be it known that I, WILLIAM STOCKS, a subject of the King of Great Britain, residing at 334 George Street, Fitzroy, in the State of Victoria, Commonwealth of Australia, have invented new or improved composition of matter for use in lieu of leather or for other suitable purposes and methods or processes of manufacturing same, of which the following is a specification.

This invention has been devised to provide a new or improved material and process of producing the same which in the arts or manufactures can be employed as a substitute for leather and adaptable, with certain modifications for use for purposes other than to which leather is at present applied. The invention also embodies the method or process of manufacturing the said material.

It will be understood that with corresponding variations the ingredients and proportions herein mentioned may be altered to meet local requirements, and obviously the process may be modified in conformity therewith without departing from the invention. I shall by way of instance, describe the said composition of matter and its process of manufacture when applied to the production of a bulk material to be used as a substitute for leather or alternatively, by a slight alteration, for floor cloth.

In carrying out my invention I first employ old vulcanized rubber, which I place on a grinding machine and through the action of such machine, which must be powerfully driven owing to the frictional resistance, and the application of heat the said rubber is reduced to a comminuted state, the resultant product being then placed on one side to form a stock material to be drawn from as required, as will be hereinafter explained. I next employ a pair of heated mixing rollers and take a portion of virgin rubber or pure rubber of any kind. This is placed upon the said mixing rolls, the revolving action of which latter causes the pure rubber to be thoroughly masticated into a plastic mass. To this mass I add sulphur in sufficient quantity to produce vulcanization of the pure rubber (when submitted to heat) the proportions and the degrees of heat being well known to those skilled in the rubber manufacturing trade. When the rubber and sulphur are thoroughly mixed together the mass is removed from the action of the mixing rollers. I would have it distinctly understood that the three ingredients hereinbefore mentioned viz:— the comminuted vulcanized rubber, the pure or virgin rubber, with the sulphur added thereto form a basis from which to manufacture any of the following articles and in such varied proportions as may be required to obtain the necessary result; for instance, for first class rubber goods, motor tyre rubber, and all other articles requiring as a basis a material equal to pure rubber in elasticity or resiliency and strength. To obtain this material, which is, in actual fact to form a high grade motor tyre rubber and the like, I take about 1 lb. of pure rubber, about 5 ozs. of sulphur, and about 1 lb. of the said comminuted rubber stock. In practice these are placed on the mixing mill and worked into a plastic mass or dough by the action of the revolving rollers. When the resultant mass is sufficiently plastic and in a sufficient quantity, it is drawn out from the mill in sheet form, preferably of about $\frac{1}{32}''$ thickness, or less. This sheet is rolled upon itself as it leaves the rollers and is then placed in a darkened store room, where it will be free from draughts for a few days to permit of its solidifying and curing. In practice it has been found that by reducing vulcanized rubber to a comminuted state by subjecting the same to the grinding action of rollers and the simultaneous application of heat to the rollers, the vulcanizing agent, such as sulphur, is partially thrown off, the resultant product being in a substantially dry and elastic state with the vulcanizing agent and rubber in a partially separated condition, and that by mixing therewith virgin or pure rubber in substantially equal proportions with the addition of sulphur a product is produced which is substantially of the same quality and consistency as commercial rubber.

The foregoing described composition of matter forms a stock from which to manufacture the best grade articles down to the poorest quality articles required.

For example, I will now describe how I make floor covering by adding the below-mentioned ingredients.

I take in proportion by weight 10 lbs. of the hereinbefore mentioned stock, and place this on heated revolving rollers. To this I add 5 lbs. of pontianac gum a material well known in the rubber manufacturing trade, or in lieu of the pontianac, an equivalent quantity of good clear sticky gum. During the process of mixing in the revolution of the rollers, I add half a pint of castor oil and also dredge therein 4 lbs. of ground fibre, resulting from old motor tyre canvas, or any other analogous suitable fibrous material. I then add 2 lbs. of ordinary white lead of commerce, and about half a pint of resin, the latter having been dissolved in a sufficient melting quantity of benzine or corresponding hydro-carbon. These ingredients are well blended, kneaded, and associated together on the said mixing rollers, and any suitable colouring medium added to tint the mixture to the required appearance.

When the ingredients hereinbefore mentioned are thoroughly mixed into a truly homogeneous plastic mass or dough of a soft nature, the resultant is placed on calendering rolls, the material being fed between the top one of three rollers and the centre one, and passes around the centre roller and out between the bottom two in sheet form, the sheet passing forward through the well known sulphur bath.

The sulphur bath causes the material to vulcanize and the sheet is led on to a table, the surface of which is constructed of wire gauze. After the required length of sheet is obtained it is cut from the calendering machine and removed to another table and thoroughly washed with water containing a little caustic soda. From this bath the sheet is rinsed off with clean flowing water and thoroughly dried.

The sheet last mentioned is intended, and will then be found suitable, for a covering for the floor for dwellings and other places, it being obvious that its dimensions will be according to the quantity of material supplied to the calendering rollers. Any painted or diversified pattern required can be given to the sheet by passing it under the necessary printing machine.

The sheet may be varnished with the ordinary copal or rubber varnish, and the sheet of flooring material will then be found to be completely satisfactory for all general purposes. Where a finer material is intended to be used, as a substitute for leather, in the manufacture of boot soles, heels or the like, I may take the material and with an additional quantity of fibrous material pass the said material through the calendering rolls in sheets of about $\frac{1}{16}$th" thickness, and lead it out on to a long table, the surface of the latter consisting of galvanized iron, and when the necessary measurements of each sheet is obtained, it is cut away from the calendering rollers into squares and the thin sheets laid upon one another alternatively at right angles to the direction of the plane of the action of the calendering rollers, so that the elongation of the grain of each sheet caused in the rolling will lie in opposite directions to the sheet above or below same. Thus a thickness may be built up to say one quarter or even one half of an inch, and the number of squares thus arranged being then carefully placed under a press and submitted to a heavy pressure, the latter being according to the density of the material required. The top and bottom plates of the press are jacketed and heated by dry steam at a pressure of about 60 lbs. to the square inch for about 10 minutes. The heat vulcanizes and unifies the sheets and other materials into a homogeneous dense flexible material suitable for boot soles, imitation morocco, and other numerous leather-like articles, according to colour and taste.

I would have it understood that when the material is required in place of leather the said pontianac or alternative light gums, may be left out of the composition, but in place thereof I would add by weight 3 lbs. of the finest ground flour of leather.

I would also have it understood that I may vary the amount of sulphur hereinbefore mentioned as required for the vulcanizing of the materials, so as to obtain a greater or lesser density or hardness in the material as may be required for the particular goods for the degree of elasticity or resiliency required in the material for its purpose in the arts or manufactures.

What I do claim is:

1. A new article of manufacture, a composition of matter, comprising comminuted old or waste vulcanized rubber, virgin rubber, sulphur, white lead, castor oil, pontianac gum and dissolved resin, made by associating, blending, kneading and grinding said ingredients together substantially as described.

2. A new article of manufacture, a composition of matter, comprising old or waste vulcanized rubber finely comminuted under heated conditions, virgin rubber, sulphur, pontianac gum, resin, white lead, castor oil and ground fibrous material, made by associating, blending, kneading and grinding said ingredients together substantially as described.

3. A new article of manufacture, a composition of matter, comprising comminuted old or waste vulcanized rubber, virgin rubber, sulphur, clear sticky gum made by dissolving one part of pure rubber in five parts of benzine, resin, white lead, castor oil and ground fibrous material, made by associating, blending, kneading and grinding said ingredients together and vulcanizing the mixture substantially as described.

4. A new article of manufacture, a material comprising comminuted old or waste vulcanized rubber, virgin rubber, sulphur and leather flour made by associating, blending, kneading and grinding said ingredients together and rolling the mixture into sheets, said sheets being laid upon one another so that the elongation of the grain of each caused in the rolling will be at right angles to that of adjoining sheets, and the pile of sheets so formed being vulcanized together under heavy pressure substantially as described.

5. A new article of manufacture, a composition of matter comprising 16 parts of comminuted old or waste vulcanized rubber having blended therewith 16 parts of pure rubber and 5 parts of sulphur, 10 parts of the aforesaid mixture having 5 parts of a viscous gum mixed therewith, substantially as and for the purpose specified.

6. A new article of manufacture, a composition of matter comprising 16 parts of comminuted old or waste vulcanized rubber having blended therewith 16 parts of pure rubber and 5 parts of sulphur, 10 parts of the aforesaid mixture having mixed therewith 5 parts of a viscous gum and one part of castor oil, substantially as and for the purpose specified.

7. A new article of manufacture, a composition of matter comprising comminuted old or waste vulcanized rubber having blended therewith virgin rubber and sulphur, the aforesaid mixture having mixed therewith a viscous gum and castor oil and a comminuted fibrous material dredged into the mass, substantially as and for the purpose specified.

8. A new article of manufacture, a composition of matter comprising comminuted old or waste vulcanized rubber having blended therewith virgin rubber and sulphur to form a plastic mass, and mixing with such plastic mass a viscous gum, white lead and resin dissolved in a hydrocarbon, substantially as and in the manner set forth.

In testimony whereof I affix my signature in presence of two witnesses.

WILLIAM STOCKS.

Witnesses:
  A. J. CALLINAN,
  JAMES H. ANDERSON.